(12) United States Patent
Farha et al.

(10) Patent No.: US 10,868,287 B2
(45) Date of Patent: Dec. 15, 2020

(54) BATTERY PACK ENDPLATE

(71) Applicant: FORD GLOBAL TECHNOLOGIES, LLC, Dearborn, MI (US)

(72) Inventors: Eid Farha, Ann Arbor, MI (US); James M. McManaman, West Bloomfield, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1311 days.

(21) Appl. No.: 14/805,980

(22) Filed: Jul. 22, 2015

(65) Prior Publication Data

US 2017/0025652 A1 Jan. 26, 2017

(51) Int. Cl.
*H01M 2/10* (2006.01)
*H01M 10/6554* (2014.01)
*H01M 10/625* (2014.01)

(52) U.S. Cl.
CPC ....... *H01M 2/1077* (2013.01); *H01M 10/625* (2015.04); *H01M 10/6554* (2015.04); *H01M 2220/20* (2013.01)

(58) Field of Classification Search
CPC .......... H01M 2/1077; H01M 10/6554; H01M 10/625; H01M 2220/20
USPC ....................................................... 429/120
See application file for complete search history.

(56) References Cited

U.S. PATENT DOCUMENTS

| | | |
|---|---|---|
| 6,211,646 B1 | 4/2001 | Kouzu et al. |
| 8,465,866 B2 | 6/2013 | Kim |
| 8,748,021 B2 | 6/2014 | Lim |
| 2011/0104552 A1* | 5/2011 | Kim ................... H01M 2/1016 429/151 |
| 2011/0151311 A1 | 6/2011 | Lee et al. |
| 2012/0315528 A1* | 12/2012 | Rajaie ................ B60R 16/0238 429/100 |
| 2013/0089763 A1 | 4/2013 | Lee |
| 2015/0030897 A1 | 1/2015 | Paramasivam et al. |

* cited by examiner

*Primary Examiner* — Gary D Harris
(74) *Attorney, Agent, or Firm* — David Kelley, Esq.; Carlson, Gaskey & Olds, P.C.

(57) ABSTRACT

An exemplary battery pack assembly includes an endplate with a first side region and a second side region opposite the first side region, a first connector in the first side region, and a second connector in the second side region. The first and second connectors each provide a connection point to secure the endplate to a support when a respective one of the first or second side regions is positioned proximate the support.

9 Claims, 6 Drawing Sheets

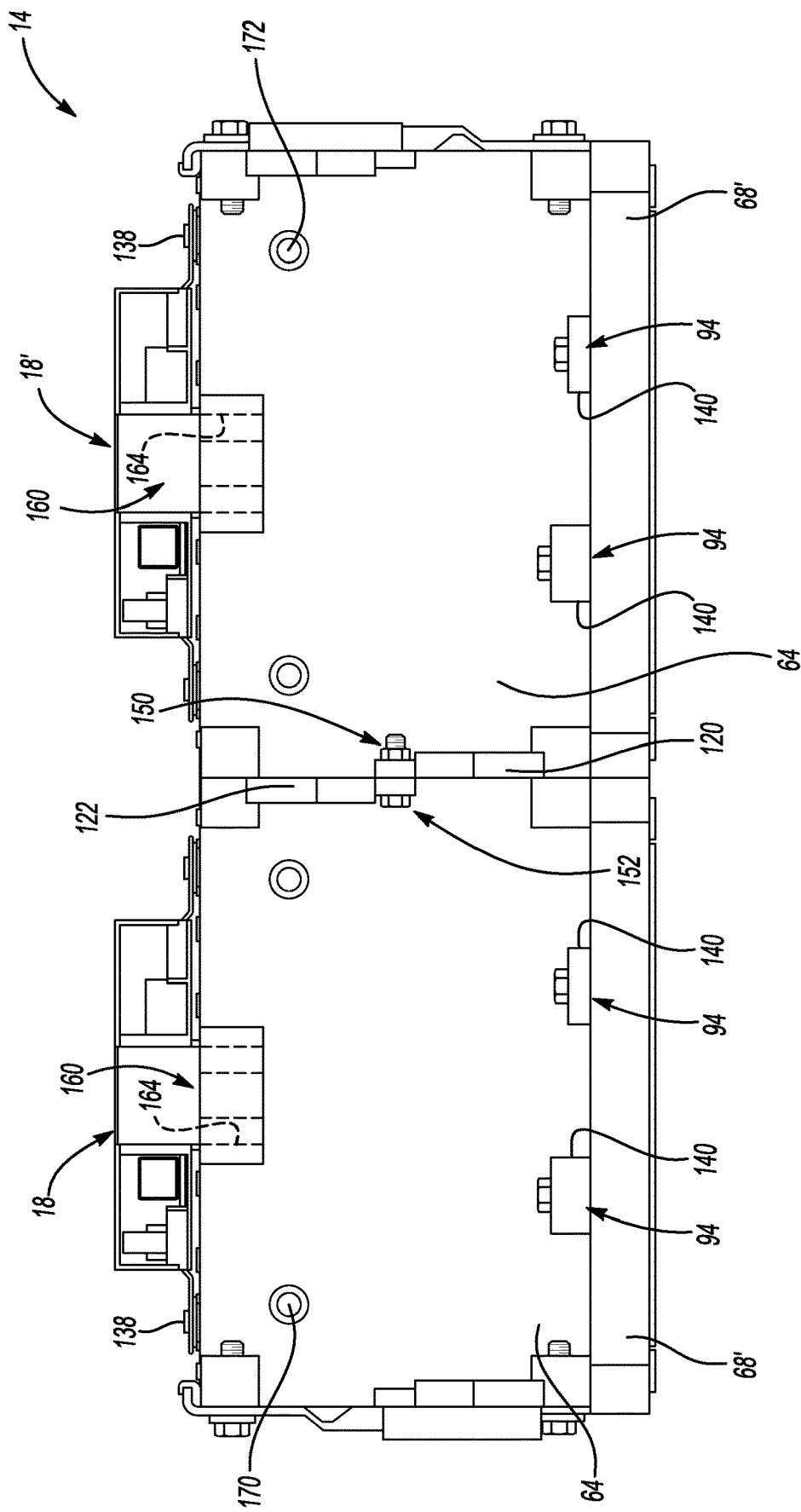

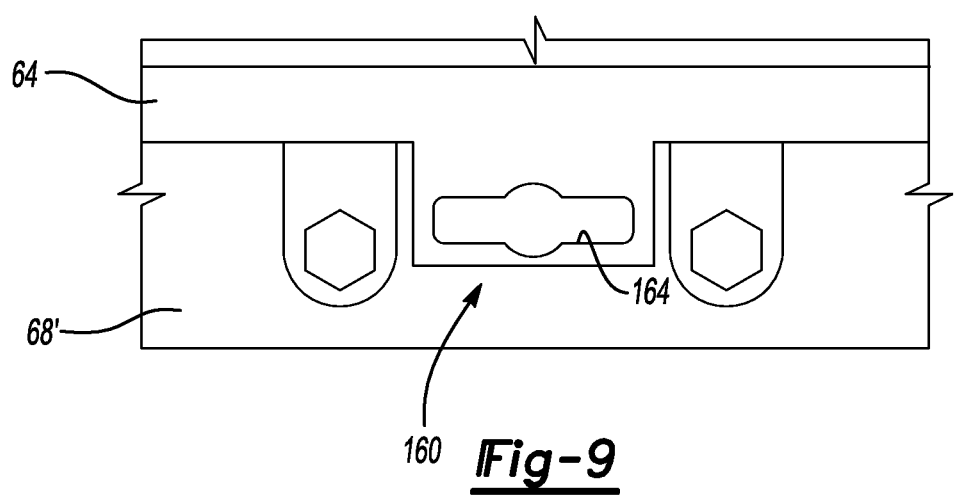

BATTERY PACK ENDPLATE

TECHNICAL FIELD

This disclosure relates to an endplate of a battery array. More particularly, this disclosure relates to an endplate that can be used in arrays having battery cells in a first orientation, and can alternatively be used in arrays having battery cells in a second orientation that is different than that first orientation.

BACKGROUND

Electrified vehicles generally differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Battery arrays include groups of battery cells that power the battery-powered electric machines. Endplates help to hold the groups of battery cells. Within the battery arrays, the groups of battery cells can have different orientations depending on, among other things, packaging constraints within an electrified vehicle. Each orientation can require a uniquely designed endplate, which increases design complexity.

SUMMARY

A battery pack assembly according to an exemplary aspect of the present disclosure includes, among other things, an endplate with a first side region and a second side region opposite the first side region. A first connector is in the first side region. A second connector is in the second side region. The first and second connectors each provide a connection point to secure the endplate to a support when a respective one of the first or second side regions is positioned proximate the support.

In a further non-limiting embodiment of the foregoing assembly, a median of the endplate extends from the first side region to the second side region. The first connector is offset from the median in a first direction, and the second connector is offset from the median in a second direction that is opposite the first direction.

In a further non-limiting embodiment of any of the foregoing assemblies, the support is a tray.

In a further non-limiting embodiment of any of the foregoing assemblies, the endplate is configured to hold a plurality of side-oriented battery cells, and further configured to hold a plurality of standard-oriented battery cells.

In a further non-limiting embodiment of any of the foregoing assemblies, the assembly includes a first flange having the first connector and a second flange having the second connector. The first and second flanges extend from surrounding areas of the endplate in a direction opposite a surface of the endplate that faces a plurality of battery cells.

In a further non-limiting embodiment of any of the foregoing assemblies, the assembly includes a first lifting feature in the first flange and a second lifting feature in the second flange. The first lifting feature provides a first lift assist link to couple a lift assist arm to the endplate when the second side region is positioned proximate the support. The second lifting feature provides a second lift assist link to couple the lift assist arm to the endplate when the first side region is positioned proximate the support.

In a further non-limiting embodiment of any of the foregoing assemblies, the assembly includes a third connector in a third side region of the endplate. The third side region extends from the first side region to the second side region. The third connector provides a connection point to secure the endplate to a heat exchanger plate that is transverse to the support.

In a further non-limiting embodiment of any of the foregoing assemblies, the connection point provided by the third connector secures the endplate to both the heat exchanger plate and another endplate.

In a further non-limiting embodiment of any of the foregoing assemblies, the connection point provided by the third connector secures the endplate to a heat exchanger plate when the third side region is positioned proximate the heat exchanger plate.

In a further non-limiting embodiment of any of the foregoing assemblies, the assembly includes a lifting feature in a fourth side region of the endplate that is opposite the third side region and that extends from the first side region to the second side region. The lifting feature provides a lift assist link to selectively couple a lift assist arm to the endplate when the third side region is positioned proximate the heat exchanger plate.

A battery pack assembly according to an exemplary aspect of the present disclosure includes, among other things, a first group of side-oriented battery cells disposed along a first axis, a second group of side-oriented battery cells disposed along a second axis that is spaced from the second axis, a first endplate at an axial end of the first group, and a second endplate at an axial end of the second group. The first endplate is interchangeable with the second endplate.

In a further non-limiting embodiment of the foregoing assembly, the first endplate mimics the second endplate when the first endplate is rotated 180 degrees relative to the second endplate about the first axis.

In a further non-limiting embodiment of any of the foregoing assemblies, the assembly further comprises a separator plate between the first and second groups.

In a further non-limiting embodiment of any of the foregoing assemblies, the first endplate and the second endplates each include a connector in a side region. The connector of the first endplate and the connector of the second endplate join the first and second endplates to each other and to the separator plate.

In a further non-limiting embodiment of any of the foregoing assemblies, the connector of the first endplate and the connector of the second endplate are configured to secure the respective one of the first endplate or the second endplate to a battery structure to hold a standard-oriented group of battery cells when the side region is positioned proximate the battery structure.

In a further non-limiting embodiment of any of the foregoing assemblies, the terminals of the group of side-oriented battery cells face laterally away from the separator plate in a first direction, the terminals of the group of side-oriented battery cells face laterally away from the separator plate in a second direction, and the terminals of the standard-oriented group of battery cells face upwardly away from the battery structure.

A method according to an exemplary aspect of the present disclosure includes, among other things, forming a first connector in a first side region of an endplate and a second connector in a second side region of the endplate that is opposite the first side region. The first connector provides a connection point to secure the endplate to a support when the first side region is positioned proximate the support. The second connector provides a connection point to secure the endplate to the support when the second side region is positioned proximate the support.

In a further non-limiting embodiment of the foregoing method, the method includes casting the endplate during the forming.

In a further non-limiting embodiment of any of the foregoing methods, the method includes forming a third connector in a third side region of the endplate. The third side region extends from the first side region to the second side region. The third connector provides a connection point to secure the endplate to a heat exchanger plate that is transverse to the support.

In a further non-limiting embodiment of any of the foregoing methods, the connection point provided by the third connector is used to secure the endplate to a heat exchanger plate when the third side region is positioned proximate the heat exchanger plate.

DESCRIPTION OF THE FIGURES

The various features and advantages of the disclosed examples will become apparent to those skilled in the art from the detailed description. The figures that accompany the detailed description can be briefly described as follows:

FIG. 8 shows an end view of example standard-oriented arrays.

FIG. 9 shows a top view of a selected portion of one of the arrays of FIG. 8.

DETAILED DESCRIPTION

This disclosure relates generally to an endplate of a battery array. More particularly, the disclosure relates to an endplate that can be used in arrays having battery cells in a first orientation, and can alternatively be used in an array having battery cells in a second, different orientation.

Figure 1:
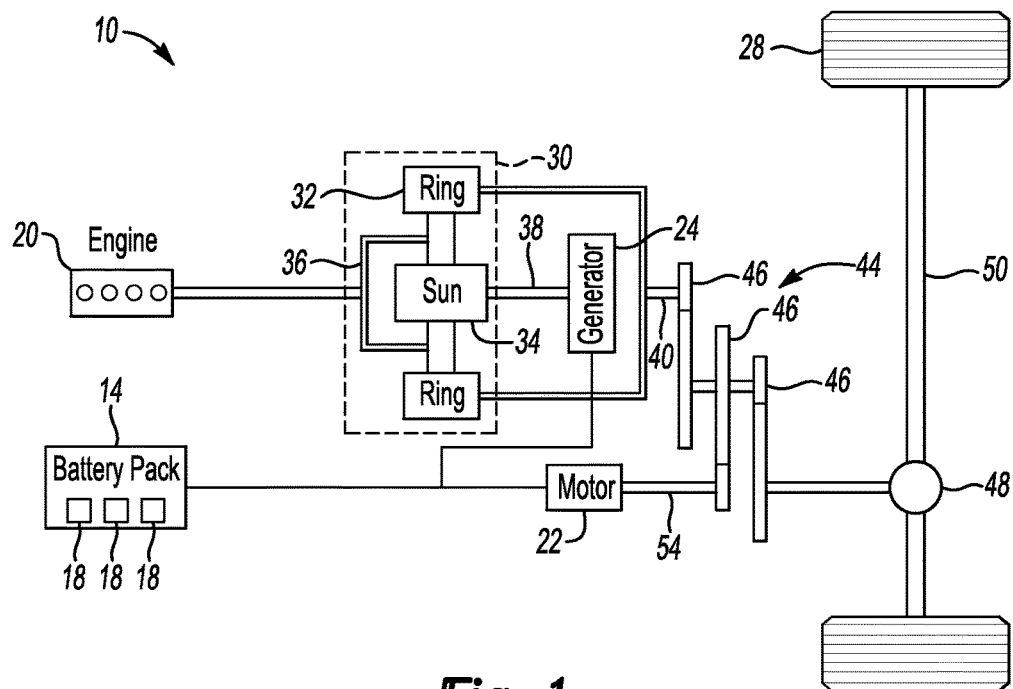
FIG. 1 shows a highly schematic view of a powertrain for an example electrified vehicle.

Referring to FIG. 1, a powertrain 10 of a hybrid electric vehicle (HEV) includes a battery pack 14 having a plurality of arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28.

The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
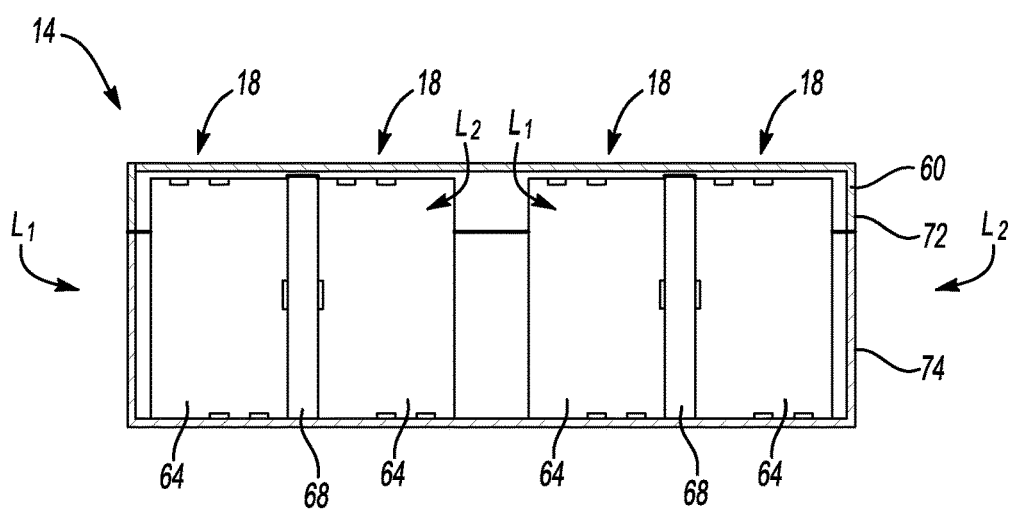
FIG. 2 shows a partial schematic view of a battery pack for use in the powertrain of FIG. 1 and having portions cut away to reveal a plurality of side-oriented arrays.

Referring now to FIG. 2 with continuing reference to FIG. 1, the example battery pack 14 includes a plurality of arrays 18 within a housing 60. The arrays 18 are side-oriented arrays. The arrays 18 include endplates 64 and a heat exchanger plate 68. The heat exchanger plate 68 is sandwiched between pairs of laterally adjacent arrays 18.

The housing 60 includes an upper lid 72 secured to a lower tray 74. The endplates 64 are secured to a support, such as the lower tray 74, to hold the arrays 18 within the pack 14.

Generally, the arrays 18 are considered side-oriented arrays. Terminals of the battery cells within the arrays 18 face laterally outward within the pack 14 in the example side-oriented arrays. The terminals of the battery cells within the arrays 18 face away from the heat exchanger plate.

The endplate 64 can be used to hold battery cells on a first lateral side $L_1$ of the associated heat exchanger plate 68. The endplate 64 can be rotated to alternatively hold battery cells on an opposite, second lateral side $L_2$ of the associated heat exchanger plate 68. In the view show in FIG. 2, the first lateral side $L_1$ is on a left-hand side of the heat exchanger plate 68, and the second lateral side $L_2$ is a right-hand side of the heat exchanger plate 68.

In some examples, the heat exchanger plate 68 is omitted and endplates of the laterally adjacent arrays 18 are secured to each other.

The arrays 18 could be secured to the lower tray 74 or could be secured to a heat exchanger plate (not shown) disposed upon the lower tray 74.

Figure 3:
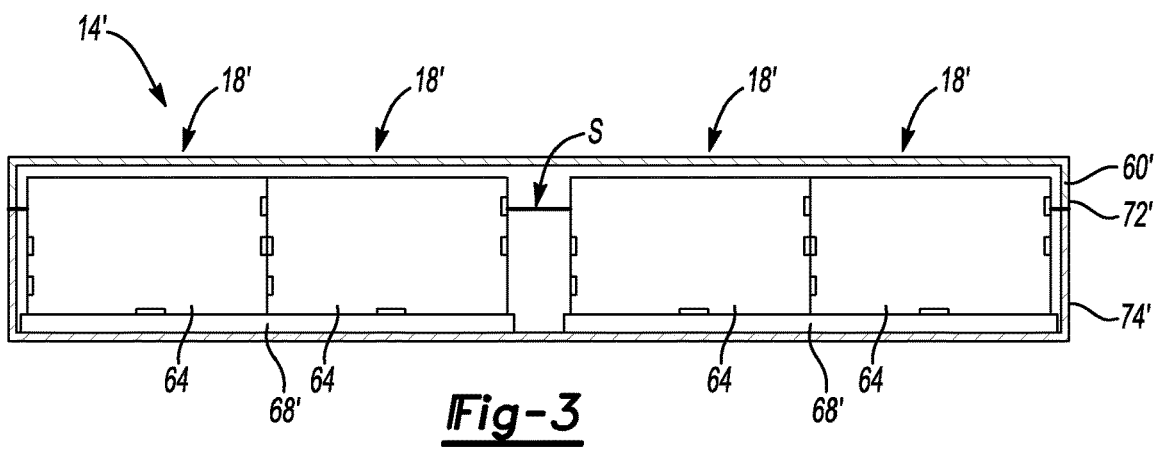
FIG. 3 shows a partial schematic view of a battery pack for use in the powertrain of FIG. 1 and having portions cut away to reveal a plurality of standard-oriented arrays.

Referring now to FIG. 3 with continuing reference to FIGS. 1 and 2, another example battery pack 14' for use in the powertrain 10 includes arrays 18' within a housing 60'. The arrays 18' include the endplates 64 and heat exchanger plates 68'. Within the battery pack 14', laterally adjacent endplates 64 are secured to each other and to the heat exchanger plate 68'.

In some examples, the heat exchanger plate 68' is resized to permit all four (or some other number of endplates 64 to be secured to each other. In such an example, the space S would be eliminated, which can reduce a packaging footprint of the battery pack 14'.

The housing 60' includes an upper lid 72' and a lower tray 74'. The endplates 64 are secured to the heat exchanger plate 68', which is secured to a support, such as the lower tray 74', to hold the arrays 18' within the housing 60'.

In another example, the endplates 64 are secured to the lower tray 74' via a fastener that extends through an aperture in the heat exchanger plate 68', or extends to the lower tray 74' outside a perimeter of the heat exchanger plate 68'.

Generally, the arrays 18' are considered standard-oriented arrays as the terminals of battery cells within the arrays 18' face upwardly within the battery pack 14'.

Notably, the endplate 64 can be reoriented from the positions of the endplate 64 shown in FIG. 2 so that the endplate 64 can be used as the endplate 64 within the battery pack 14' of FIG. 3. The endplates 64 in the battery pack 14 are thus interchangeable with the endplate 64 in the battery pack 14'.

Substantially all the geometries of the endplates 64 in the battery pack 14 are the same as substantially all the geometries of the endplates 64 in the battery pack 14'. That is, the dimensions of the endplates 64 in the battery pack 14 mimic the dimensions of the endplates 64 in the battery pack 14'.

Because the endplates 64 in the battery pack 14 have effectively the same dimensions as the endplates 64 in the battery pack 14', a unique endplate design is not required for the first lateral side $L_1$ and the second lateral side $L_2$ of the battery pack 14. Further, a unique endplate design is not required for the battery pack 14 and the battery pack 14'. The endplates 64 in the battery pack 14 and the endplate 64 in the battery pack 14' can be manufactured using a common casting process or some other common method of manufacture.

The relative positions terms, such as "upper," "lower," and "upwardly," are with reference to the normal operational positioning of the pack 14 when the hybrid electric vehicle having the powertrain 10 is on flat or level ground.

Figure 4:
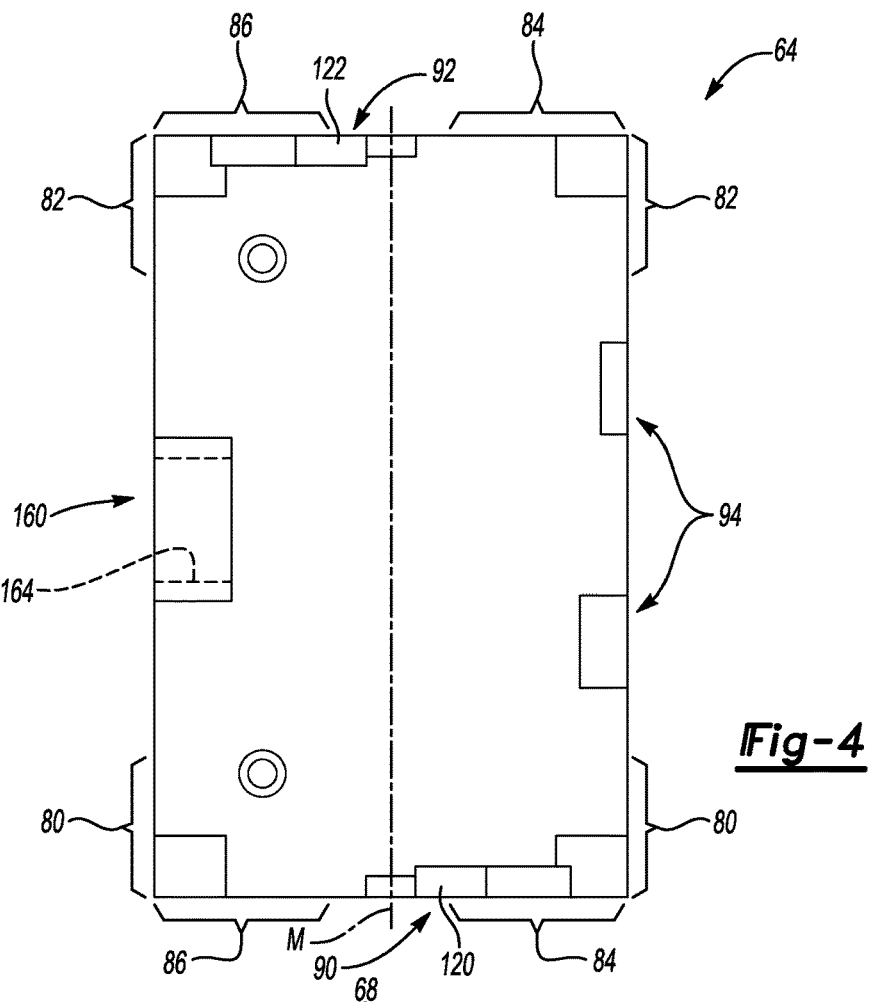
FIG. 4 shows a front view of an example endplate for use in the battery pack of FIG. 2 and the battery pack of FIG. 3.

Referring now to FIG. 4, the endplate 64 includes a first side region 80, a second side region 82, a third side region 84, and a fourth side region 86. The first side region 80 opposes the second side region 82. The third side region 84 opposes the fourth side region 86. The third side region 84 and the fourth side region 86 extend to connect the first side region 80 to the second side region 82.

The size, shape, and proportions of the first side region 80, the second side region 82, the third side region 84 and the fourth side region 86 are not limited to the specific configuration of the endplate 64 in FIG. 4.

The first side region 80 includes at least one first connector 90. The second side region 82 includes at least one second connector 92. The third side region 84 includes at least one third connector 94.

Figure 6:
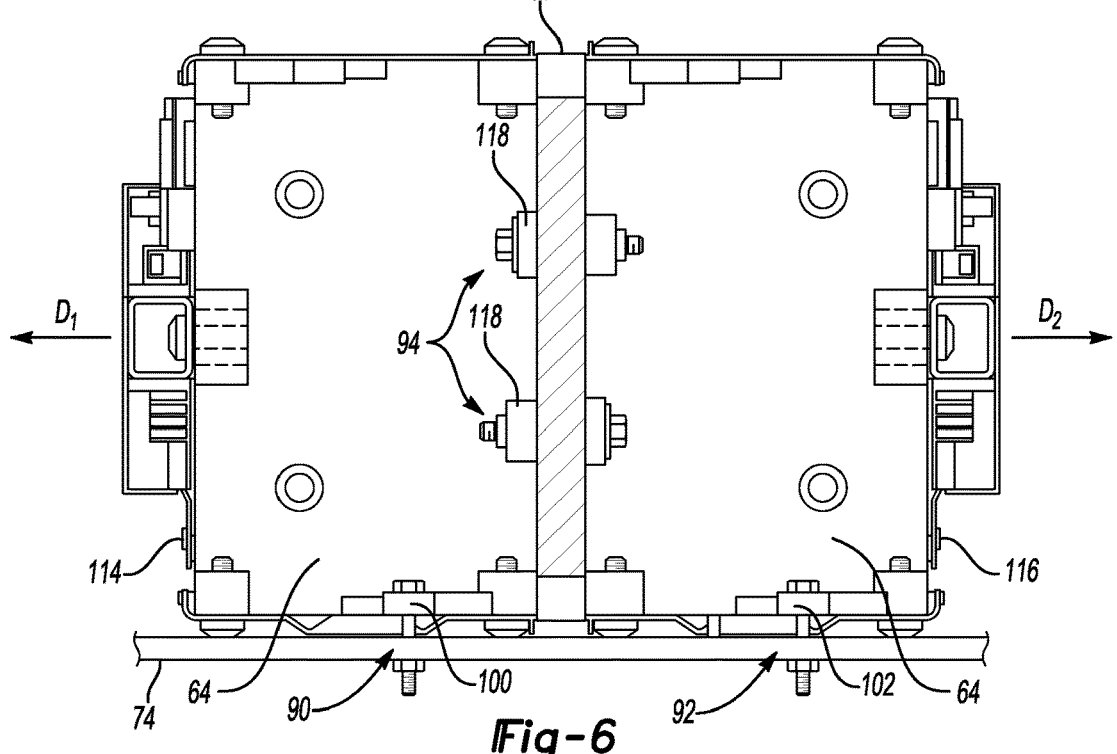
FIG. 6 shows an end view of the arrays of FIG. 5.
Figure 5:
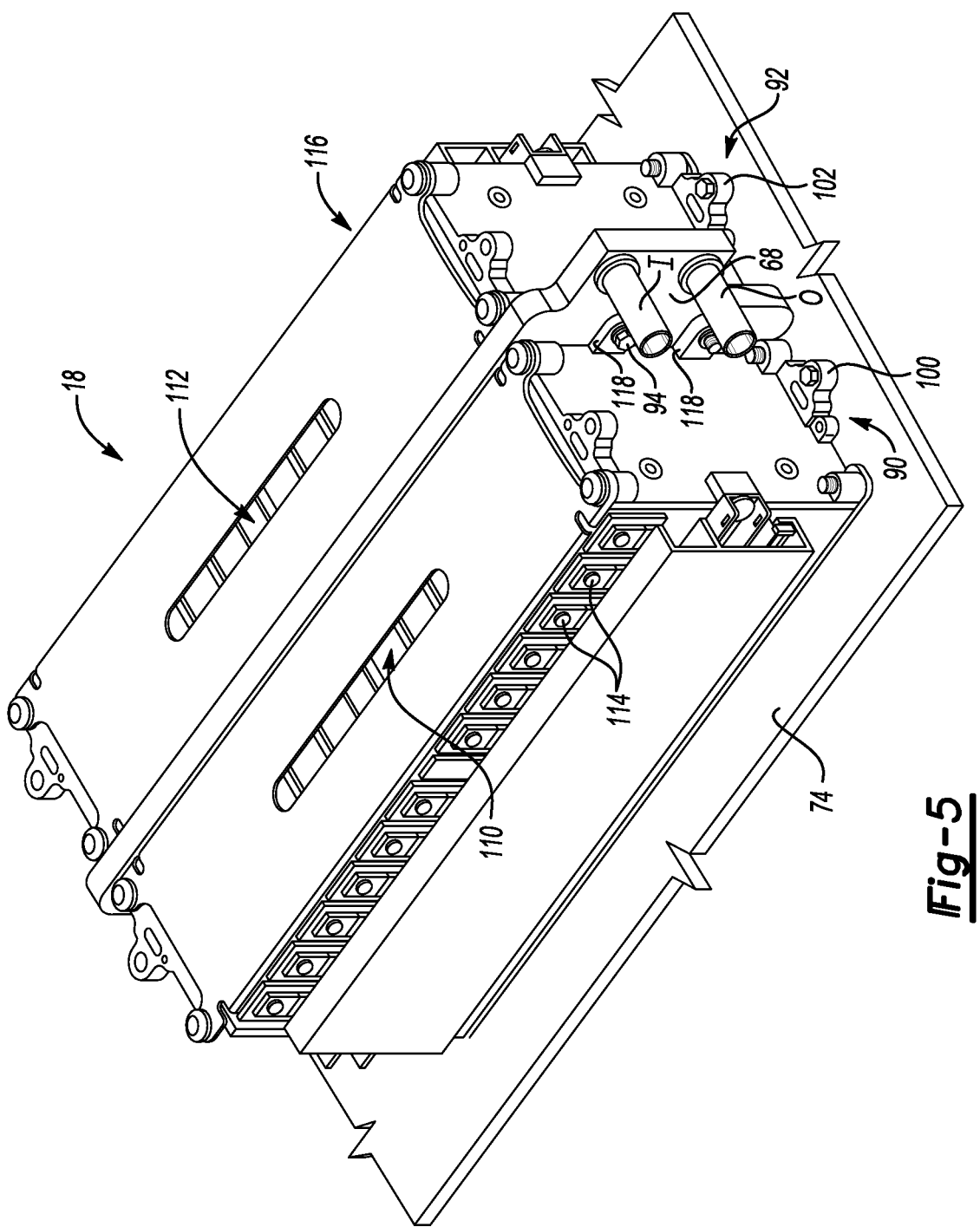
FIG. 5 shows a perspective view of example side-oriented arrays.
Figure 7:
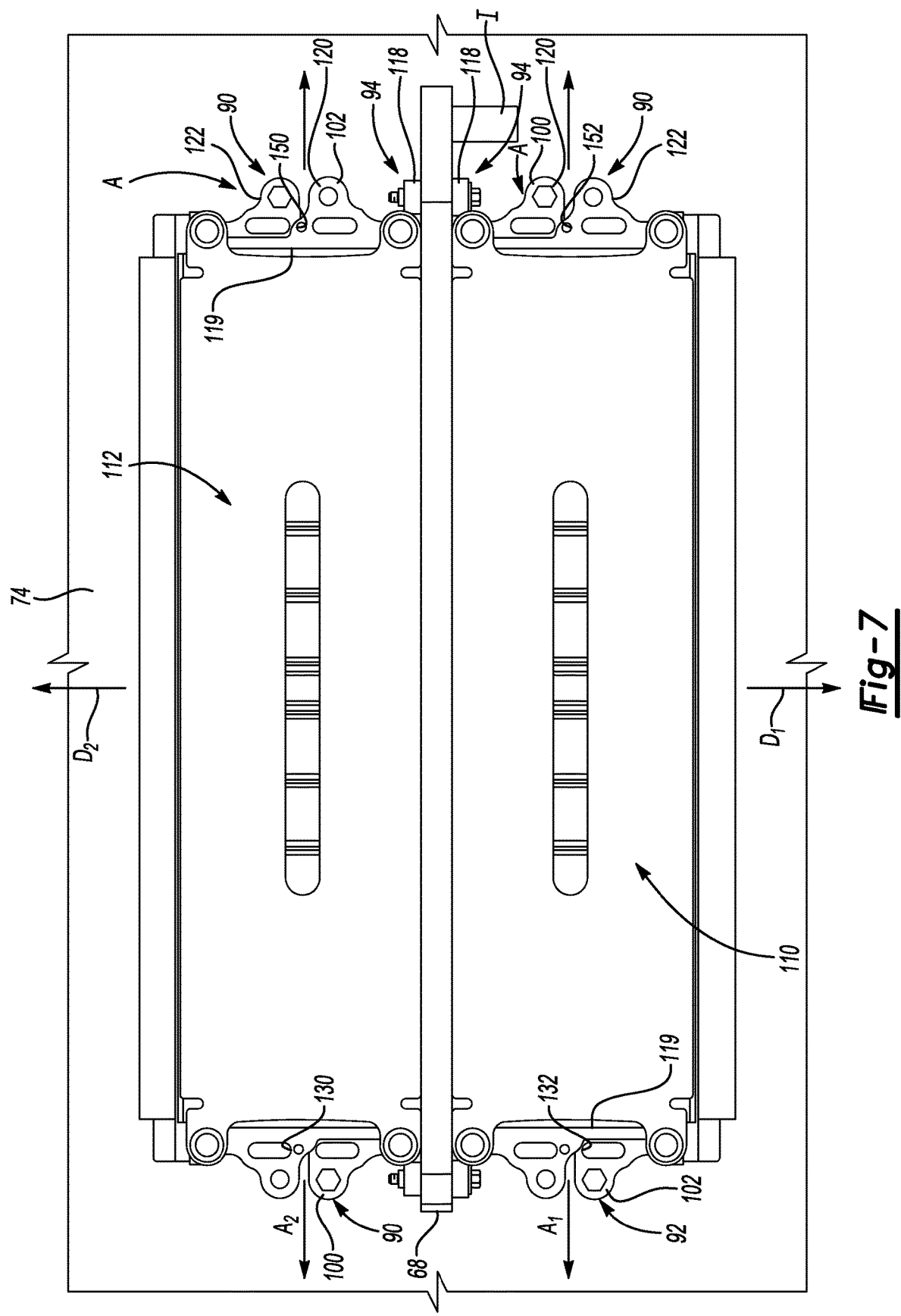
FIG. 7 shows a top view of the arrays of FIG. 5.

Referring now to FIGS. 5 to 7 with continuing reference to FIG. 4, in the battery pack 14, the first connector 90 provides a first connection point 100 to secure the endplate 64 to the lower tray 74 when the first side region 80 is positioned proximate the lower tray 74. The second connector 92 provides a second connection point 102 to secure the endplate 64 to the lower tray 74 when the second side region 82 is positioned proximate the lower tray 74.

A median M of the endplate 64 extends from the first side region 80 to the second side region 82. The first connector 90 is laterally offset to one side of the median M. The second connector 92 is laterally offset to an opposing side of the median M. Offsetting the first connector 90 and the second connector 92 in this way provides tool clearance in an area A to facilitate positioning a tool, such as a torque tool, when securing the first connector 90 or the second connector 92 to the lower tray 74 to provide the respective connection point 100 or connection point 102.

The battery pack 14 includes a first group of side-oriented battery cells 110 disposed along a first axis $A_1$ and a second group of battery cells 112 disposed along a second axis $A_2$. The first axis $A_1$ is laterally spaced from the second axis $A_2$.

The groups of battery cells 110 and 112 are prismatic battery cells in this example. In other examples, the battery cells 110 and 112 could be another type of battery cell, such as a pouch cell.

The first group of battery cells 110 includes terminals 114. The second group of battery cells 112 includes terminals 116. The terminals 114 of the first group of battery cells 110 face in a first direction $D_1$. The terminals 118 of the second group of battery cells 112 face in a second direction $D_2$ that is opposite the first direction $D_1$.

The heat exchanger plate 68 is sandwiched between the first group of battery cells 110 and the second group of battery cells 112. The terminals 114 and the terminals 116 face outwardly away from the heat exchanger plate 68.

In some examples, a separator plate is used in place of the heat exchanger plate 68 to separate the first group of battery cells 110 from the second group of battery cells 112.

In other examples, the heat exchanger plate 68 is omitted such that the first group of battery cells 110 and second group of battery cells 112 are directly laterally adjacent one another.

The heat exchanger plate 68 is used to remove thermal energy from the battery pack 14. The heat exchanger plate 68 includes a coolant inlet I and a coolant outlet O. The heat exchanger plate 68 provides an internal coolant path (not shown). Coolant moves to the heat exchanger plate 68 through the inlet I and circulates through the coolant path within the heat exchanger plate 68. The coolant carries thermal energy from the battery pack 14 through the outlet O and away from the battery pack 14.

When the first side region 80 is positioned proximate the lower tray 74, the third side region 84 is positioned proximate the heat exchanger plate 68. When the second side region 82 is positioned proximate the lower tray 74, the third side region 84 is positioned proximate the heat exchanger plate 68.

The third connector 94 provides a connection point 118 to secure the endplate 64 to the heat exchanger plate 68, and, in this example, to the laterally adjacent endplate 64. The third connector 94, in this example, includes two individual connection points 118. The connection points 118 are vertically spaced from each other within the pack 14.

Mechanical fasteners, such as bolts or screws, can be used to provide the connection points 100, 102, and 118. Other types of fasteners could be used to provide the connection points 100, 102, and 118 in other examples.

The endplate 64 can be used to secure the first group of battery cells 110. The endplate 64 can be rotated 180 degrees about the axis $A_1$ and repositioned to secure the second group of battery cells 112. The endplate 64 can be used at a first axial end of the pack 14 or at an opposing axial end of the pack 14.

The first group of battery cells 110 are compressed axially between one of the endplates 64 using the first connection point 100 and one of the endplates 64 using the second connection point 102. The second group of battery cells 112 are compressed axially between one of the endplates 64 using the first connection point 100 and one of the endplates 64 using the second connection point 102.

The pack 14 includes four endplates 64 in this example. Each of the endplates 64 is manufactured via a common manufacturing process. Each of the endplates 64 can be used in place of the other endplates 64 by reorienting the endplate 64 relative to the remaining portions of the pack 14.

The endplate 64 includes a surface 119, a first flange 120, and a second flange 122. The surface 119 faces axially toward the first group of battery cells 110 or the second group of battery cells 112. The first flange 120 and the second flange 122 extend axially from the remaining portions of the endplate 64 in a direction opposite the surface 119. The first flange 120 is in the first side region 80. The second flange 122 in the second side region 82.

The first flange 120 includes the first connector 90. The second flange 122 includes the second connector 92. In this example, the connectors 90 and 92 are apertures in the respective flange 120 or 122.

The first flange 120 further includes a first lifting feature 130. The second flange 122 further includes a second lifting feature 132. The lifting features 130 and 132 are apertures in the first flange 120 and the second flange 122 in this example.

The first lifting feature 130 provides a lift assist link to couple the endplate 64 with a lift assist arm. The lift assist link provided by the first lifting feature 130 can couple the endplate 64 to the lift assist arm when the second side region 82 is vertically below the first side region 80.

The second lifting feature 132 provides a lift assist link to couple the endplate 64 with a lift assist arm. The lift assist link provided by the second lifting feature 132 can coupled the endplate 64 to the lift assist arm when the first side region 80 is vertically below the second side region 82.

The lift assist arm is coupled to the endplate 64 through the lift assist link when a portion of the lift assist arm is at least partially within the first lifting feature 130 or 132. When the lift assist arm is coupled to the endplate through the lift assist link, the lift assist can be operated by a user to manipulate a position of the array 18, or more that one of the arrays 18, during, for example, manufacturing and array decking.

A person having skill in this art and the benefit of this disclosure could contemplate how to engage a lift assist arm with the endplate 64 through the first lifting feature 130 or 132.

Referring now to FIGS. 8 and 9 with continuing reference the FIGS. 4 and 7, the endplates 64 are used within the pack 14' to secure standard-oriented arrays 18'. Standard-oriented arrays include groups of battery cells having terminals 138 facing upwardly away from the respective heat exchanger plate 68'. The groups of battery cells are compressed axially between pairs of the endplates 64.

When the endplate 64 holds the group of standard-oriented battery cells, a connection point 140 provided by the third connector 94 connects the endplate 64 to the heat exchanger plate 68'. The connection point 140 can comprise a mechanical connection using a mechanical fastener received within an aperture provided by the third connector 94. In another example, the connection point 140 provided by the third connector 94 connects the endplate 64 to a tray and extends through an aperture in the heat exchanger plate 68', or extends to the tray outside a perimeter of the heat exchanger plate 68'.

The first flange 120 provides a first array-to-array coupling feature 150. The second flange 122 provides a second array-to-array coupling feature 152. When the endplate 64 holds the group of standard oriented battery cells, the coupling feature 150 can be connected to the coupling feature 152 to secure the endplate 64 and respective array 18' to the endplate 64 of a laterally adjacent array 18'. A mechanical fastener can couple the coupling features 150 and 152 in this example.

In this example, the first array-to-array coupling feature 150 is formed within the first flange 120, and the second array-to-array coupling feature 152 is formed within the second flange 122.

The first array-to-array coupling feature 150 and the second array-to-array coupling feature 152 are positioned at the median M of the endplate 64. Notably, the areas of the flanges 120 and 122 that provide the coupling features 150 and 152 do not extend from the remaining portions of the endplate 64 as far as the portions of the flanges 120 and 122 that provide the first connector 90 and the second connector 92. The coupling features 150 and 152 thus provide sufficient clearance to secure the endplate 64 when used in the battery pack 14 having the side-oriented arrays of FIGS. 5 to 7.

The endplate 64 includes a third lifting feature 160 within the fourth side region 86. The third lifting feature 160 comprises an aperture 164.

A lift assist arm can be inserted in the aperture 164 to provide a lift assist link between the lift assist arm and the third lifting feature 160. When a portion of the lift assist arm is inserted within the aperture 164, the lift assist can be used to reposition the array 18' or a portion of the array 18'.

The example endplate 64 include a boss 170 and a boss 172. Each boss 170 and 172 provides an anchoring point to anchor, for example, leads from the terminals 114, 116, or 138.

The boss 170, the boss 172, or both can be used to anchor the leads, array interconnects, etc. Using the boss 170, the boss 172 or both can depend on whether the endwall 64 is used within the side-oriented array 18 or the standard oriented array 18'.

For example, in the side-oriented arrays 18 of FIGS. 5 to 7, the boss 170 can be used when on a left-hand side of the heat exchanger plate 68, and the boss 162 can be used when on a right-hand side of the heat exchanger plate 68. In the standard-oriented packs of FIGS. 8 and 9, both bosses 170 and 172. One boss 170 anchors leads from terminals 138 on one lateral sides of the array 18', and the boss 172 anchors leads from terminals 138 on the opposing lateral side.

Anchoring the leads can include positioning a Christmas-tree fastener within the boss 170 or the boss 172 and securing the leads to that fastener.

Features of the disclosed examples are an endplate that can be used in a plurality of different orientations to provide a common endplate across multiple types of battery packs and vehicles. With an endplate usable in a variety of battery array orientations, testing is reduced as well as tooling costs.

The endplates 64 may facilitate array-to-array attachment, particularly in the standard-oriented arrays of FIGS. 8 and 9. Such an attachment can eliminate static clearance requirements between laterally adjacent arrays.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack assembly, comprising:
an endplate with a first side region and a second side region opposite the first side region;
a first connector in the first side region; and
a second connector in the second side region, the first and second connectors each providing a connection point to secure the endplate to a support when a respective one of the first or second side regions is positioned proximate the support; and
a third connector in a third side region of the endplate, the third side region extending from the first side region to the second side region, the third connector providing a connection point to secure the endplate to a heat exchanger plate that is transverse to the support, wherein the connection point provided by the third connector secures the endplate to both the heat exchanger plate and another endplate.

2. The battery pack assembly of claim 1, wherein a median of the endplate extends from the first side region to the second side region, the first connector is offset from the median in a first direction, the second connector is offset from the median in a second direction that is opposite the first direction.

3. The battery pack assembly of claim 1, wherein the support is a tray.

4. The battery pack assembly of claim 1, wherein the endplate is configured to hold a plurality of side-oriented battery cells, and further configured to hold a plurality of standard-oriented battery cells.

5. The battery pack assembly of claim 1, further comprising a first flange having the first connector and a second flange having the second connector, the first and second flanges extending from surrounding areas of the endplate in a direction opposite a surface of the endplate that faces a plurality of battery cells.

6. The battery pack assembly of claim 5, further comprising a first lifting feature in the first flange and a second lifting feature in the second flange, the first lifting feature providing a first lift assist link to couple a lift assist arm to the endplate when the second side region is positioned proximate the support, the second lifting feature providing a second lift assist link to couple the lift assist arm to the endplate when the first side region is positioned proximate the support.

7. A battery pack assembly, comprising:
an endplate with a first side region and a second side region opposite the first side region;
a first connector in the first side region; and
a second connector in the second side region, the first and second connectors each providing a connection point to secure the endplate to a support when a respective one of the first or second side regions is positioned proximate the support,
a first group of side-oriented battery cells disposed along a first axis;
a second group of side-oriented battery cells disposed along a second axis that is spaced from the second axis;
the endplate as a first endplate at an axial end of the first group; and
a second endplate at an axial end of the second group, the first endplate interchangeable with the second endplate,
wherein the support is a separator plate between the first and second groups,
wherein the second endplate include a first connector in a first side region, the first connector of the first endplate and the first connector of the second endplate joining the first and second endplates to each other and to the separator plate.

8. The battery pack assembly of claim 7, wherein the first connector of the first endplate is configured to secure the first endplate to a battery structure to hold a standard-oriented group of battery cells when the first side region is positioned proximate the battery structure.

9. The battery pack assembly of claim 8, wherein the terminals of the group of side-oriented battery cells face laterally away from the separator plate in a first direction, the terminals of the group of side-oriented battery cells face laterally away from the separator plate in a second direction, and the terminals of the standard-oriented group of battery cells face upwardly away from the battery structure.

* * * * *

UNITED STATES PATENT AND TRADEMARK OFFICE
CERTIFICATE OF CORRECTION

PATENT NO. : 10,868,287 B2
APPLICATION NO. : 14/805980
DATED : December 15, 2020
INVENTOR(S) : Eid Farha, James M. McManaman and Patrick Daniel Maguire Page 1 of 1

It is certified that error appears in the above-identified patent and that said Letters Patent is hereby corrected as shown below:

In the Claims

In Claim 7, Column 10, Line 25; replace "along a second axis that is spaced from the second axis" with --along a second axis that is spaced from the first axis--

In Claim 7, Column 10, Line 26; replace "the endplate as a first endplate" with --the endplate a first endplate--

In Claim 7, Column 10, Line 32; replace "endplate include a first endplate" with --endplate includes a first endplate--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*